United States Patent [19]

Kolkmann

[11] 4,405,213
[45] Sep. 20, 1983

[54] MAKEUP EYEGLASSES WITH SLIDING FRAMES

[76] Inventor: Ingeborg Kolkmann, A 6323, Bad Haring, Austria

[21] Appl. No.: 197,434

[22] Filed: Oct. 16, 1980

[30] Foreign Application Priority Data

Oct. 29, 1979 [DE] Fed. Rep. of Germany ... 7930575[U]

[51] Int. Cl.³ .............................................. G02C 5/00
[52] U.S. Cl. ........................................ 351/59; 351/55
[58] Field of Search ...................... 351/55, 57, 58, 59, 351/107, 116, 128, 148

[56] References Cited

U.S. PATENT DOCUMENTS

| | | | |
|---|---|---|---|
| 2,252,922 | 8/1941 | Goldstein | 351/55 |
| 2,842,029 | 7/1958 | Roth | 351/55 |
| 3,495,898 | 2/1970 | Del Vecchio | 351/59 |
| 3,698,801 | 10/1972 | Masucci | 351/107 |
| 3,840,294 | 10/1974 | Kneier | 351/59 |
| 4,179,756 | 12/1979 | Lucas | 351/57 |

*Primary Examiner*—R. A. Rosenberger
*Attorney, Agent, or Firm*—Sughrue, Mion, Zinn, Macpeak and Seas

[57] ABSTRACT

Makeup glasses include frames 2 attached on both sides of a nose bridge 1 and temple arms 3 hinged to the frame. To enable the application of eye makeup the nose bridge has track-like shanks 5 extending downwardly which are slidingly fitted into mating grooves 6 in the frames so that either frame together with its lens 4 can be moved below the eye. Stop locks in the form of dimples 7 and nibs 8 are provided between the shanks and the grooves to hold the frames in the pushed-up and pushed-down position.

4 Claims, 3 Drawing Figures

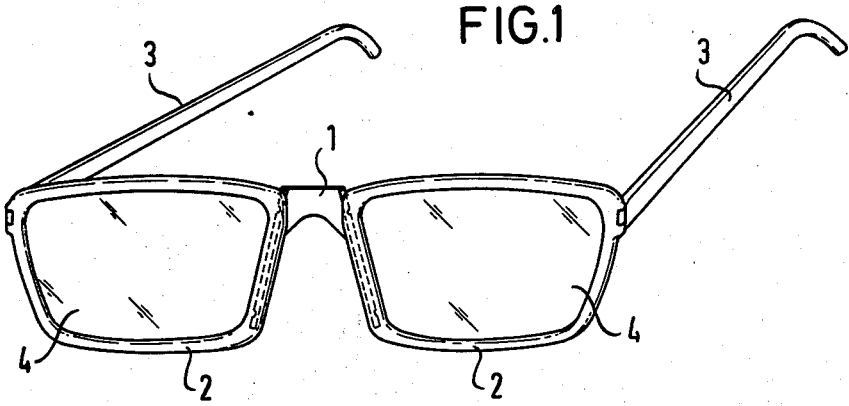
FIG. 1
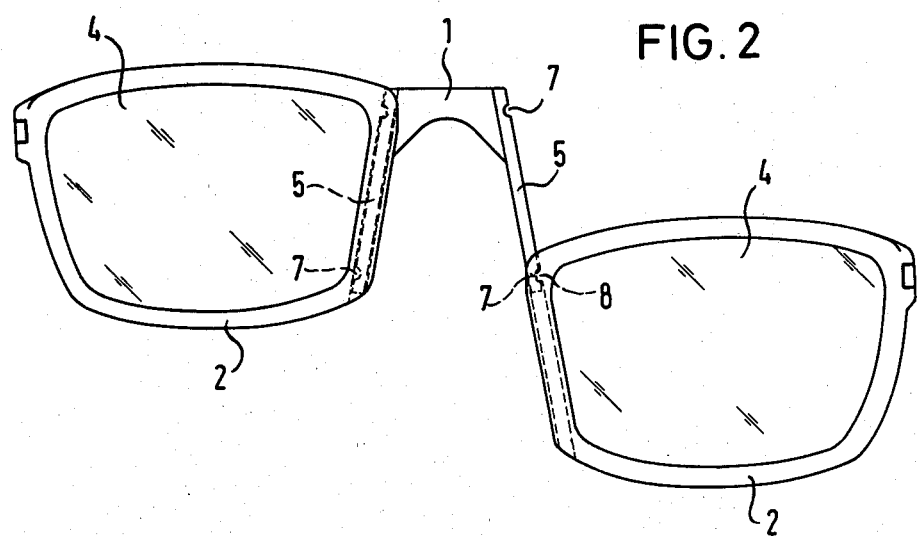
FIG. 2
FIG. 3
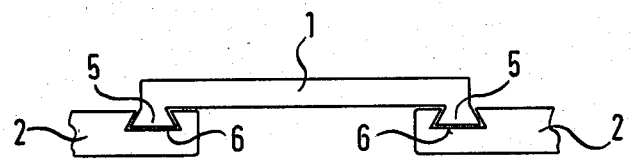

MAKEUP EYEGLASSES WITH SLIDING FRAMES

BACKGROUND OF THE INVENTION

This invention relates to makeup glasses consisting of lens frames attached on both sides of a nose bridge and temple arms hinged to the frames, wherein the lens frames can be selectively slid relative to the nose bridge.

For women glasses wearers it is difficult if not impossible to make the eyes up cleanly and to apply mascara without problems when wearing conventional glasses. If, however, the glasses are removed it is impossible to make up the eyes due to poor eyesight. It became necessary, therefore, to design glasses whose lenses can be moved away.

Makeup glasses with swinging lenses were introduced by French Pat. No. 1,266,652. With these glasses the lenses can be swung up around an axis parallel to the lenses on the top side of the glass frames. This construction means that a customary frame, that can also be worn after applying the makeup, cannot be used.

Another type of makeup glasses is disclosed in U.S. Pat. No. 3,495,898, which has only a single lens and a special frame on which the lens can be moved in front of the left or right eye or rotated around a central pin. It is not possible to wear these glasses normally after applying makeup.

Austrian Pat. No. 340,701 discloses makeup glasses of the type described above of which the frame pieces are each connected with a hinge to the nose bridge so that either the left or right frame piece with lens is swung up around an axis essentially perpendicular to the lens. With these glasses, however, the temple arm of the frame part that was swung up must either swing out or in so that it does not interfere with swinging the frame part up.

Finally, German Utility Model No. 78/37,464 discloses makeup glasses of the type described at the outset in which the frame pieces can be pushed up relative to the nose bridge by means of a thin telescopic connection.

SUMMARY OF THE INVENTION

The object of this invention is thus to provide makeup glasses which make it possible to comfortably and easily make up the eyes and which has a frame such that the glasses can be worn normally after making up. The construction is stable and allows the lenses to be pushed down without having to swing the temple arms on the side.

This object is achieved according to the invention by glasses having track-like shanks on the nose bridge extending downwardly along the full height of the frame pieces. The shanks are slidingly fitted into mating grooves in the frame pieces so that either the left or the right frame piece along with its lens can be pushed essentially perpendicular and downward from the transverse axis of the nose bridge. Step connections for the pushed-up and pushed-down positions of the frame pieces are provided between the shanks and the grooves.

With such a makeup glasses construction the difficulties associated with making up the eyes are eliminated because the lens that is located in front of the eye not being made up gives that eye enough acuity that the other eye can be made up completely free of the otherwise obstructing frame that is now pushed down.

With the one frame piece pushed down the main frame rests on the nose by way of the nose bridge and on one ear by way of the temple arm of the frame piece not pushed down, as it would in normal use. The other temple arm slides over the ear, and rests on the cheek bone beneath or along side of the ear. The frame piece not pushed down rests very securely during the making up process.

The shanks and the grooves may have a dovetail configuration. Furthermore, the shanks are advantageously arranged on the side of the frame pieces toward the eyes. The lock connection consists of a dimple at the top and bottom end of each shank and a spring or nib on the top end of the groove in the frame piece.

BRIEF DESCRIPTION OF THE DRAWINGS

In the drawings:

FIG. 1 shows a perspective view of a pair of makeup glasses according to the invention in the pushed together condition, FIG. 2 shows a front view of the manner in which the frame pieces are attached to the nose bridge, with one frame piece pushed down, and FIG. 3 shows an enlarged top view of the nose bridge and frame pieces.

DETAILED DESCRIPTION OF THE PREFERRED EMBODIMENTS

The makeup glasses shown in FIG. 1 have a nose bridge 1 and frames 2 attached on both sides thereof. Temple arms 3 are hinged on the sides of the frames opposite the nose bridge. Lenses 4 made to the prescription of the wearer are securely mounted in the frames.

The nose bridge 1 has two track-like shanks 5 extending downwardly along the entire height of each frame 2 and having a trapezoidal, round or some other cross sectional profile. Corresponding grooves 6 are provided in the frames in which the shanks 5 of the nose bridge can slide. The connection can also be accomplished with a groove in the shank 5 and a mating track or each frame. Either frame 2 together with the associated lens 4 can thus be pushed downwardly, whereby the exposed eye is free to be made up. The rest of the frame rests securely on the nose bridge 1 and both temple arms 3 while the exposed eye is being made up. Stop lock connections 7, 8 between the shanks 5 and grooves 6 hold the up or down position of the frames.

FIG. 2 shows a front view of the frames 2 together with the nose bridge 1 with one frame piece 2 in the pushed down position. It is evident that the eye can be freely made up with the entire frame 2 in this bottom position. The lock connection consists of dimples 7 at the upper and lower end of each shank and a spring at the upper end of each groove 6. A nipple or raised nib can also be used in place of the spring 8.

FIG. 3 shows a magnified top view of the nose bridge 1 in order to clearly show the arrangement and shape of the shanks 5 and grooves 6 comprising the sliding connection. The shanks are arranged in the grooves in the shape of a dovetail with a trapezoidal cross section or profile. The cross section of the shanks 5 and grooves 6 can also be circular, rectangular, or the like. The shanks and grooves can be located on the side of the frames 2 toward or away from the eyes.

What is claimed is:

1. Makeup glasses, comprising: a separate pair of frames (2) each adapted to mount an individual eyeglass lens, a pair of temple arms (3) individually hinged to the lens frames, a nose bridge (1), a pair of track-like shanks (5) on opposite sides of the nose bridge and extending downwardly therefrom, a pair of grooves (6) individually defined in central, proximate, substantially vertical sides of the frames and extending throughout the heights thereof, said grooves being configured to matingly engage and slidably receive said nose bridge shanks so that either the left or the right frame along with a lens (4) mounted therein can be pushed perpendicularly away and downwardly from the transverse axis of the nose bridge, and lock stops for the pushed-up and pushed-down positions of the frames provided between the shanks and the grooves, said makeup glasses having the appearance of an ordinary and conventional pair of eyeglasses without extraneous appendages or attachments when both frames are in their pushed-up positions.

2. Makeup glasses according to claim 1, wherein the shanks and the grooves are dovetail fitted into one another.

3. Makeup glasses according to claim 1 or 2, wherein the shanks and grooves are located on the side of the frames toward the eyes.

4. Makeup glasses according to claim 1 or 2, wherein each lock stop comprises a dimple (7) on the upper and lower end of each shank and a spring or nib (8) on the upper end of the groove in the frame.

* * * * *